Inventor
Lucien Péras
Stevens, Davis, Miller & Mosher
Attorneys

Inventor
Lucien Péras
Stevens, Davis, Miller & Mosher
Attorneys

United States Patent Office 3,323,621
Patented June 6, 1967

3,323,621
DEVICE FOR CONTROLLING ENGINE THROTTLE AND CLUTCH DURING GEAR CHANGES
Lucien Péras, Billancourt, France, assignor to Regie Nationale des Usines Renault, Billancourt, Seine, France
Filed Feb. 25, 1966, Ser. No. 530,123
Claims priority, application France, Oct. 25, 1962, 913,456, Patent 1,351,434; Sept. 20, 1963, 948,176, Patent 84,368
3 Claims. (Cl. 192—.8)

This is a continuation in part of my application Ser. No. 318,367, of Oct. 23, 1963, now abandoned.

In automatic change-speed gears of vehicles comprising a conventional, automatically-controlled gearbox or change-speed mechanism providing several transmission ratios between the engine and the final drive, it is necessary when shifting to a higher or lower gear to reduce the engine speed to nearly idling value and then to gradually re-accelerate the engine after the gear change has been made, the coupling or drive between the engine and gearbox being successively disengaged and re-engaged for example by means of an electromagnetic clutch.

This change in the velocity of rotation of the engine may advantageously be obtained by using an electromagnet controlling an engine power-output throttling member such as an auxiliary butterfly valve or strangler shutter throttling the induction pipe or choke tube of the engine in the conventional case of a carburetor engine, but under certain conditions a jerk or shock occurs in the operation of the vehicle. Thus, for instance, when driving uphill with the carburetor half-open, the torque surge or drop is felt more strongly than with a hand-controlled transmission mechanism.

It is the essential object of the present invention to provide in the case of an automatic transmission of the type broadly set forth hereinabove and in a particularly simple manner a satisfactory, efficient and reliable operation. To this end, this invention is concerned more particularly with an auxiliary control device for automatic gear change of an engine-driven vehicle equipped with clutch means adapted to be disengaged when changing speed, this auxiliary device comprising a member for cutting off or throttling the engine which is controlled by an electromagnet in conjunction with a clutch control member, characterized in that means are also provided for damping the movement of said auxiliary engine throttling member in order to put this throttling action in harmony with a certain progressiveness in the operation of said clutch means.

Reference will now be made to the attached drawing illustrating diagrammatically the manner in which the present invention may be carried out in practice. In the drawing.

Figure 1:
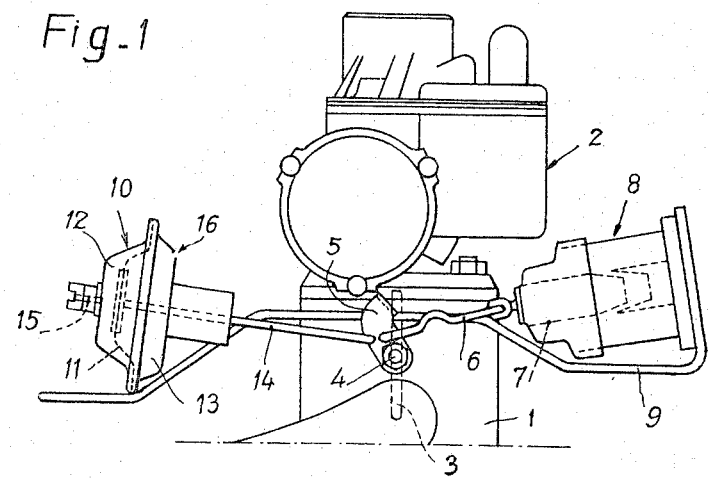
FIGURE 1 is an elevational view showing an auxiliary throttle control member according to this invention.
Figure 2:
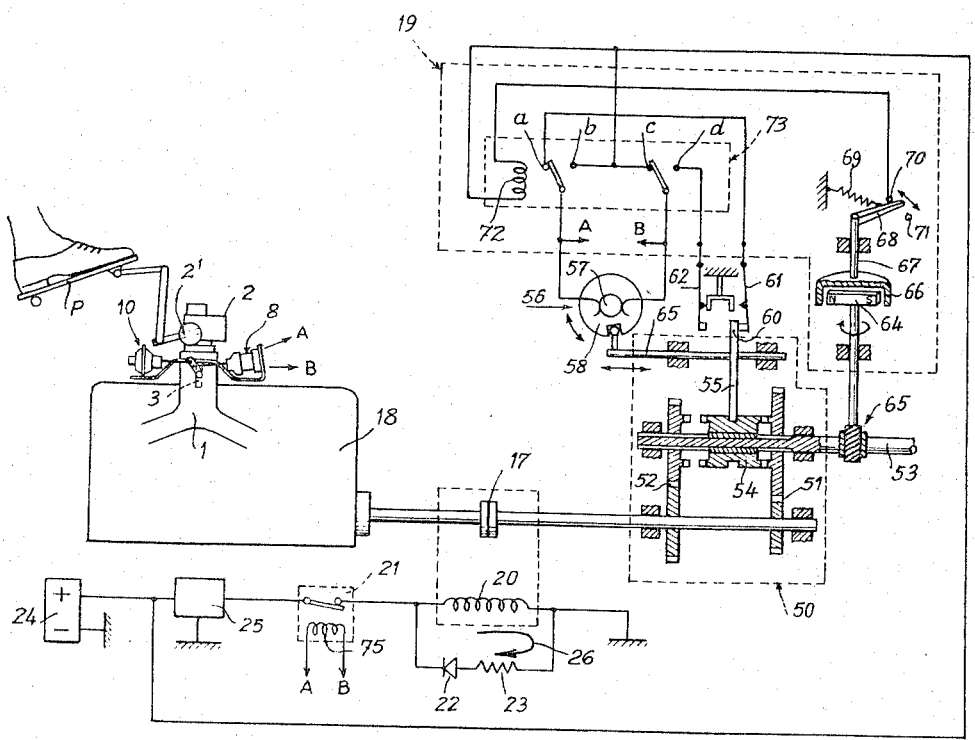
FIGURE 2 is a diagrammatic view showing the combined control of the throttle, clutch means and change-speed mechanism.

Referring first to FIGURES 1 and 2, there is shown an induction pipe 1 of an engine equipped with a carburetor 2 having its main throttle or butterfly valve 2¹ operatively connected in the conventional manner to the accelerator pedal P. Mounted inside the induction pipe 1 is an auxiliary butterfly 3 pivoted on a pin 4 and adapted to cut off the engine power output for the purpose set forth hereinabove. The pivot pin 4 is rigid with a control lever 5 connected through a link 6 to the movable member 7 of an electromagnet 8 mounted on a support 9 fixed in relation to the induction pipe 1.

Also connected to the control lever 5 is a damping device 10 consisting in this example of a pneumatic capsule divided by a flexible diaphragm 11 into two chambers 12, 13 and secured to the support 9, the diaphragm being connected through a rod 14 to said control lever 5. One of the chambers, in this case chamber 12, communicates with the surrounding atmosphere through a gaged orifice 15 and the other chamber 13 communicates freely with the atmosphere through a relatively large orifice 16.

As illustrated in FIGURE 2, this engine throttling device responsive to said damping means is associated with a clutch control device adapted notably to effect a gradual disengagement of the drive, the clutch means shown diagrammatically at 17 being adapted to transmit the torque from the engine 18 to a change-speed mechanism 50 of which the gear changes are subordinate to the operation of an automatic governor 19 for example of any known type.

The clutch means 17 illustrated is of the electromagnetic type comprising a control winding shown diagrammatically at 20 and energized under the control of an electric switch 21 controlled in turn by the governor 19 at each gear change in conjunction with the electromagnet 8 of the engine throttling device.

Stress is herein laid on the fact that the governor-responsive and change-speed servomechanism transmission illustrated in FIGURE 2 and to be described hereinafter is given only with a view to illustrate the functional role and the interdependence to which the means constituting the subject-matter of this invention are subjected. In this example, the clutch 17 is assumed to act not only as a disconnecting clutch for the purposes of this invention, but also as an automatic starting clutch. The clutch energizing current is supplied in this case by a storage battery 24 and the reference numeral 25 designates a device adapted on the other hand to ensure the desirable gradual supply of energizing current to the winding 20 during the periods of clutch engagement for starting from rest or clutch re-engagement when changing from one gear ratio to another, this device 25 being of any known type suitable for this purpose, and notably the one described in the inventor's U.S. Patent 3,203,518, issued Aug. 31, 1965.

However, it will be noted that this clutch 17 may also act only as a disengaging clutch for gear changes, the function of an automatic starting clutch being devolved in this case to a separate clutch of known type, for example of centrifugal or hydraulic type, mounted between the engine 18 and the clutch 17 mentioned hereinabove.

In this example the change-speed mechanism 50 provides two gear ratios through trains of gears 51, 52 comprising each a loosely rotating pinion adapted to be drivingly connected to the output shaft 53 through the medium of a conventional sliding-hub 54 rotatably rigid with shaft 53 and adapted to be shifted axially therealong by means of a control fork 55. This fork is solid with a sliding rod responsive to a servomechanism shown diagrammatically at 56 and comprising an electromotor 57 connected through reduction gear means (not shown) to a cam 58 of the angular motion type which is connected in turn to a finger controlling the rod carrying the control fork 55. The terminals A and B of electromotor 57 are adapted to be alternatively fed with a positive or negative polarity under conditions to be set forth presently, whereby the cam 58 can be moved angularly in one or the other direction to set the fork 55 in the position causing the meshing engagement of its dogs with one or the other of said trains of gears 51, 52. In these positions a finger 60 rigid with said fork 55 is adapted to engage either of a pair of electric contacts 61, 62 inserted in the energizing circuit of motor 57 so as to open this circuit at the end of the corresponding fork movement.

The governor illustrated at 19 comprises essentially a tachometric contactor of a known eddy-current type, consisting of a magnet 64 rotatably connected to the output shaft 53 of the change-speed gear for example by means of a worm-and-wheel gear 65. The magnet 64 is surrounded by a bell-shaped member 66 of conducting material of which the shaft 67 carries a contact arm 68 normally urged by a spring 69 against a fixed contact 70 and adapted to move away from this contact and engage a stop 71 when, at a predetermined road speed of the vehicle, the driving torque applied to the bell-shaped member 66 by the rotary magnet 64 overcomes the elastic resistance of spring 69. This spring is made of conducting material and constantly connects the contact arm 68 to the negative polarity of the circuit illustrated. The fixed contact 70 is connected to the coil 72 of a relay 73 comprising two contact arms and four fixed contacts $a$, $b$, $c$ and $d$ constituting a reversing switch controlling the direction of rotation of motor 57.

The coil of electromagnet 8 and the coil of another relay 75 controlling the opening of contact 21 are connected in parallel to the terminals A and B of the motor circuit.

This transmission operates as follows:

When the circuit illustrated is energized and the vehicle is still, the contact arm 68 of governor 19 engages the fixed contact 70 and closes the circuit controlling the energization of coil 72 of relay 73, whereby the contact arms of this relay engaging respectively contacts $a$ and $c$ connect respectively through contact $c$ the terminal B to the positive polarity, and through contact $a$ the other terminal A to the negative polarity, inasmuch as contact 61 is not already open by the finger 60 of fork 55 which, in this direction of energization of motor 57, is urged to the position causing the engagement of the first gear ratio through the train of gears 51; in other words, if this speed is normally engaged, neither electromagnet 8 nor relay 73 are energized due to the opening of contact 61. This condition prevails until the vehicle is started from rest and a road speed sufficient for changing to the second gear ratio is attained, the contact arm 68 then moving away from contact 70. At this time relay 73 is deenergized and its movable arms engage contacts $b$, $d$, thus reversing the polarities of terminals A and B, contact 62 being now closed. Then the motor 57 and cam 58 start rotating to move the fork 55 in the direction to cause the engagement of the second gear, through gears 52. At the same time, with the aforesaid connection of terminals A and B, the electromagnet 8 and relay 67 are energized and control the former the movement of throttle 3 to its closed position (to throttle the engine) and the latter the opening of contact 21 (to the disengage the clutch 17 and disconnect the drive) until the second ratio is actually engaged, that is, until the contact 62 is opened at the end of the corresponding stroke of fork 55.

When changing down to first gear as a consequence of the return of arm 68 to the position in which the governor contact 70 is closed, the polarities of terminals A and B are also reversed and the electromagnet 8 and relay 73 are energized during the time period necessary for the operation of the change-speed servomechanism.

Under these conditions, if the means constituting the subject-matter of this invention were not provided, the engine power output would be suddenly cut off as a consequence of the actuation of the auxiliary throttle 3, as well as a sudden disconnection of the drive through clutch 17.

Considering the clutch 17, the desired progressiveness of its disengagement may be obtained by providing in parallel with the winding 20 a diode 22 preventing the passage of normal clutch-energizing current in the branch line of the circuit in which this diode is inserted, a resistance 23 being preferably associated with this diode.

To obtain a gradual disengagement of the drive, the means for supplying electric energizing current to winding 20 of clutch 17 may also consist of an arrangement of the type described in the U.S. Patent No. 3,112,418 to the present inventor, depicting essentially means for gradually supplying current to the winding of an electromagnetic clutch, this patent also describing alternate forms of embodiment adapted to produce the clutch disengagement by gradually cutting off the energizing current.

Figure 3:
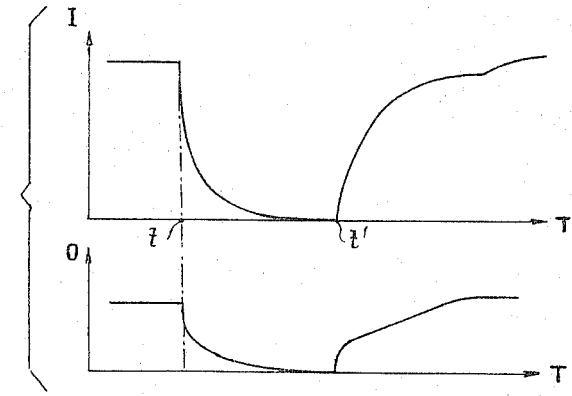
FIGURE 3 is a diagram illustrating the law governing the clutch disengagement and the corresponding throttle closing movement.

Thus the clutch energizing current may gradually be reduced and finally cut off according to the law illustrated in the upper diagram of FIGURE 3, wherein the time T is plotted in abscissa against the current I in the clutch winding 20 in ordinate. In the assembly illustrated diagrammatically by way of example in FIGURE 2 the progressiveness of the current reduction in the winding 20 as a consequence of the opening of contact 21 at a moment $t$ is due to the self-induction current flowing in this winding in the direction shown by the arrow 26, which is the direction past the diode 22. The law of current reduction will then depend on the inductance of the winding concerned and also on the total resistance due to the winding and also to the resistance 23, the latter being selected according to the desired law.

On the other hand, the simultaneous and gradual closing of auxiliary throttle 3 responsive to the electromagnet 8 is caused by the throttling of the air forced through the gaged orifice 15 of the pneumatic capsule 10, this damping or dashpot effect becoming effective more particularly during the last fraction of the closing movement of said auxiliary throttle 3, so as to obtain a throttle closing law in harmony with the law governing the decrease in the energizing current supplied to winding 20, as will be clearly seen from the lower diagram of FIGURE 3 wherein the time T is plotted in abscissa against the throttle or butterfly valve opening O in ordinate.

The damping action according to this law may also be obtained by properly calculating the volume of chamber 12 in relation to the volumetric displacement produced by the deflection of diaphragm 11, or alternatively by so disposing the assembly of link 6 and throttle control lever 5 that this connecting-rod system is nearly at its dead center position in the normally open position of throttle 3.

In FIGURE 3 the lower diagram shows likewise the law governing the re-opening of said auxiliary throttle 3 as a consequence of the gear change movement which also takes place with the same damping effect as in the closing direction, and the upper diagram illustrates a typical example of simultaneous and gradual restoring of the energizing current in winding 20, the time period $tt'$ necessary for performing the gear change being for example of the order of one second.

However, in the case of an arrangement of the type illustrated in FIGURE 1, it was observed that during relatively rapid to and fro movements of the control members and therefore of the movable element of the damping device or dashpot, the accumulation of residual air occurring at the end of the operative stroke interfered with the return movement of said movable element and therefore with the thrust then exerted on this element by said residual air.

Figure 4:
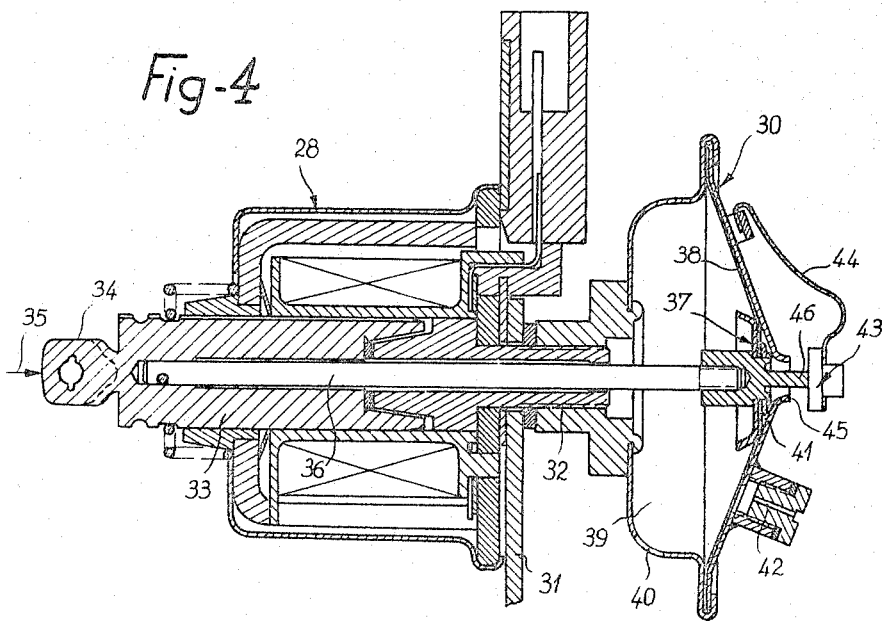
FIGURE 4 is an axial section showing a modified form of embodiment of this invention in which an electromagnet is utilized for controlling the throttling action in conjunction with a damping device.

It is the object of the modified structure illustrated in FIGURE 4 to avoid this inconvenience.

In this alternate form of embodiment the electromagnet 28 and the damping device consisting of an air capsule 30 are assembled to constitute a self-contained unit mounted in this example on either side of a fixed support 31 for example by screwing the base of said capsule on a shank provided for fastening the electromagnet.

The movable core 33 of this electromagnet has formed on its outer end a lug 34 for connecting same to the shown) consisting, for example, as already illustrated, of an auxiliary throttle or butterfly adapted to choke the induction manifold of the engine.

The retracted position of core 33 shown in the drawing corresponds to the end of the engine throttling member control stroke 35.

The core 33 is connected to an axial rod 36 freely mounted in the central cavity of the electromagnet fastening shank, and the outer end of this rod 36 is rigidly attached to a compound cup washer 37 clamping the central portion of the diaphragm 38 of the air capsule.

This diaphargm normally divides the capsule 30 into two chambers, one chamber 39 constantly communicating freely with the surrounding atmosphere through a relatively large passage such as 40, the other chamber 41, except for the diaphragm distortion shown in the drawing, normally communicating with the atmosphere through a gaged orifice 42. This other chamber 41 is also normally closed by a venting valve comprising a valve member 43 carried by a spring 44 and urged thereby against its seat 45.

The capsule aperture centrally of said seat 45 receives therethrough a valve control rod 46 carried by the outer face of cup washer 37 and in axial alignment with the rod 36.

As a result, when changing speed, the engine power output is decreased as a consequence of the energization of electromagnet 28, whereby the capsule diaphargm 38 will firstly move away from its initial intermediate position in the direction causing the air in chamber 41 to be compressed and forced through the gaged orifice 42, thus providing the desired damping effect, until, at the end of the stroke 35 cutting off the engine power output, the valve member 43 is actuated by the push-rod 46 as clearly shown in the drawing, thus permitting a quick venting of the residual air from the chamber 41. With this arrangement the reverse stroke releasing the engine power output will also take place according to the desired damping law (closing the venting valve and subsequently utilizing the gaged orifice 42) independently of the time period elapsing between these two opposite strokes.

This arrangement is also advantageous in that the end portion of the stroke controlling the engine power cut-off takes place at a faster rate in comparison with the preceding form of embodiment, the initial portion of the reverse power-restoring stroke being also faster, and furthermore the braking of this reverse stroke is increased considerably without extending the total time necessary for performing this stroke (due to the faster initial speed thereof).

Figure 5:
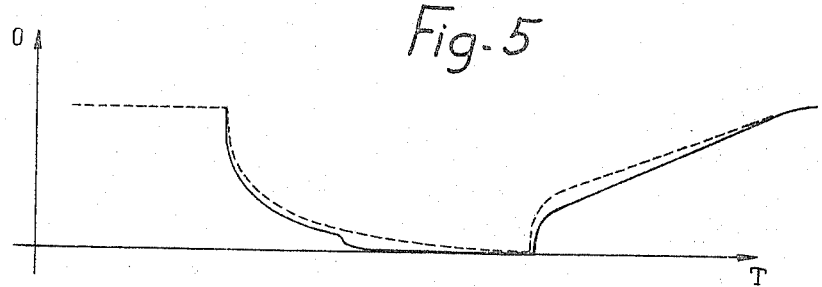
FIGURE 5 is a comparative diagram of the laws governing the throttle closing movement in the forms of embodiment illustrated in FIGURES 1 and 4.

This is illustrated by the comparative curves of FIGURE 5, wherein the curve in broken line designates the control law shown in FIGURE 3 and the thick line curve designates a law obtainable by applying the form of embodiment of FIGURE 4.

On the other hand, in this last-named form of embodiment, the damping characteristic applied to the engine power output may notably be modified by varying the length of push-rod 46 and by properly selecting the position of the gaged orifice 42 so that this orifice be closed by the diaphragm 37 after a predetermined stroke thereof.

It is clear that the practical application of this invention should not be construed as being limited by the specific case of a fully-automatic change-speed transmission as described herein, since it is also applicable to a semi-automatic transmission wherein the selection of the gear ratio (the gear change being still automatic) is left to the driver's initiative instead of being controlled by an automatic governor.

Of course, the damping device may also be of a fluid or hydro-pneumatic type, although a pneumatic damper constitutes a simpler solution for the result contemplated.

I claim:

1. An auxiliary control device for an automatic change-speed mechanism of a vehicle having an engine and a clutch adapted to be disengaged while changing gears, said device comprising a clutch control member, an electromagnet, means responsive to said electromagnet for cutting off the engine power output, means to initiate gear changes, said last-mentioned means actuating simultaneously said clutch control member and said electromagnet at every gear change, means for progressively actuating said clutch, means for simultaneously damping the movement of said engine power output cutoff means with the progressive actuation of said clutch, said clutch being an electromagnetic clutch, a diode connected in parallel with said clutch winding thereby allowing winding self-induction current to pass through said diode when the electric supply is cut off, and a resistor connected in series with said diode.

2. An auxiliary control device for an automatic change-speed mechanism of a vehicle having an engine and a clutch adapted to be disengaged while changing gears, said device comprising a clutch control member, an electromagnet, means responsive to said electromagnet for cutting off the engine power output, said means being independent of the operation of the vehicle's accelerator pedal, means to initiate gear changes, said last-mentioned means actuating simultaneously said clutch control member and said electromagnet at every gear change, means for progressively actuating said clutch, means for simultaneously damping the movement of said engine power output cutoff means with the progressive actuation of said clutch incorporating a pneumatic dashpot, a ventilating valve in said dashpot adapted to be opened at the end of the damping stroke corresponding with the aforesaid engine power cutoff.

3. A device according to claim 2 wherein said ventilating valve comprises a valve member and a control tappet mounted respectively on two component elements of the dashpot performing relative movements.

References Cited
UNITED STATES PATENTS

| | | | |
|---|---|---|---|
| 2,323,202 | 6/1943 | Christian | 74—472.3 |
| 2,671,351 | 3/1954 | Neracher | 192—.09 X |
| 2,741,350 | 5/1956 | Dodge | 192—.084 X |
| 2,763,347 | 9/1956 | Haubourdin et al. | 192—3.5 X |
| 3,039,321 | 6/1962 | Weymann | 192—3.5 X |

BENJAMIN W. WYCHE, III, *Primary Examiner.*

DAVID J. WILLIAMOWSKY, *Examiner.*